US011892364B2

(12) United States Patent
Thurman et al.

(10) Patent No.: US 11,892,364 B2
(45) Date of Patent: Feb. 6, 2024

(54) TORQUE SENSOR USING COUPLED LOADS AND FEWER STRAIN GAGES

(71) Applicant: ATI Industrial Automation, Inc., Apex, NC (US)

(72) Inventors: Travers Thurman, Brevard, NC (US); Andrew Glusiec, Apex, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 59 days.

(21) Appl. No.: 17/668,625

(22) Filed: Feb. 10, 2022

(65) Prior Publication Data

US 2023/0251151 A1 Aug. 10, 2023

(51) Int. Cl.
*G01L 3/00* (2006.01)
*G01L 3/10* (2006.01)
*G01L 5/1627* (2020.01)

(52) U.S. Cl.
CPC ............ *G01L 3/108* (2013.01); *G01L 5/1627* (2020.01)

(58) Field of Classification Search
CPC .............................. G01L 3/108; G01L 5/1627
USPC ...................................................... 73/862.191
See application file for complete search history.

(56) References Cited

U.S. PATENT DOCUMENTS

| 4,911,023 A * | 3/1990 | Izumi | G01L 5/162 |
| | | | 73/862.044 |
| 4,919,418 A * | 4/1990 | Miller | A63B 21/154 |
| | | | 482/901 |
| 4,969,366 A | 11/1990 | Okada | |
| 5,142,906 A * | 9/1992 | Smith | F16K 37/0041 |
| | | | 73/862.627 |
| 5,894,094 A * | 4/1999 | Kuchler | G01L 5/1627 |
| | | | 73/146 |

(Continued)

FOREIGN PATENT DOCUMENTS

| CA | 2264827 C | 6/2007 |
| DE | 10037782 A1 | 2/2002 |
| WO | 2018073188 A1 | 4/2018 |

OTHER PUBLICATIONS

Aghili, F. et al., "Design of a Hollow Hexaform Torque Sensor for Robot Joints", The International Journal of Robotics Research, Dec. 2001, pp. 967-976, vol. 20, No. 12.

(Continued)

*Primary Examiner* — Max H Noori
(74) *Attorney, Agent, or Firm* — COATS & BENNETT, PLLC (57) ABSTRACT

A torque sensor comprises a transducer plate having a center area and periphery connected by a plurality of spokes and instrumentation beams. The transducer plate exhibits mechanical compliance under axial torque, but stiffness under off-axis loads. Strain gages attached to instrumentation beams detect deformation caused by axial torques. The instrumentation beams may be asymmetric, allowing strain gages to be placed in regions of high sensitivity to axial torques and low sensitivity to off-axis loads. The strain gage responses from some off-axis loads are designed to be coupled to, or linearly dependent on, the strain gage responses of other off-axis loads. This reduces the number of strain gages necessary to resolve the loads. The spokes and beams are cost-effectively formed by removing adjacent transducer plate material in simple shapes.

28 Claims, 8 Drawing Sheets

(56) References Cited

U.S. PATENT DOCUMENTS

| | | | |
|---|---|---|---|
| 8,984,962 B2* | 3/2015 | Christmann | G01L 3/1428 |
| | | | 73/862.041 |
| 9,038,484 B2* | 5/2015 | Seibold | G01L 5/1627 |
| | | | 73/862.045 |
| 2007/0180931 A1 | 8/2007 | Takamura et al. | |
| 2015/0135856 A1* | 5/2015 | Kim | G01L 1/22 |
| | | | 73/862.045 |
| 2017/0205296 A1 | 7/2017 | Bradford | |

OTHER PUBLICATIONS

Khan, H. et al., "Towards Scalable Strain Gauge-Based Joint Torque Sensors", Sensors, 2017, pp. 1-17, vol. 17, No. 1905.

Zhang, H. et al., "Development of Torque Sensor with High Sensitivity for Joint of Robot Manipulator Using 4-Bar Linkage Shape", Sensors, 2016, pp. 1-12, vol. 16, No. 991.

Ubeda, R. et al., "Design and Manufacturing of an Ultra-Low-Cost Custom Torque Sensor for Robotics", Sensors, 2018, pp. 1-18, vol. 18, No. 1786.

* cited by examiner

TORQUE SENSOR USING COUPLED LOADS AND FEWER STRAIN GAGES

FIELD OF INVENTION

The present invention relates generally to force and torque sensors, and in particular to a sensor optimized for sensing axial torque, which exploits coupled off-axis loads to reduce the minimum number of strain gages required to resolve the axial torque.

BACKGROUND

Robots are an indispensable part of manufacturing, testing, assembly, and packing of products; assistive and remote surgery; space exploration; operation in hazardous environments; and many other applications. Many robots and robotic applications require quantization of forces applied or experienced, such as material removal (grinding, sanding, and the like), parts assembly, remote digging or other manipulation of the environment, and the like.

An industrial robot typically comprises a general-purpose actuator, or "arm," which comprises numerous segments connected by electromechanical joints that move and rotate in different axes and planes, providing numerous degrees of freedom. A six degrees of freedom (6-DOF) robot arm is commonly used in industrial manufacturing, including operations such as welding, material handling, material removal, painting, and the like. The 6-DOF design provides motion in the x-, y-, and z-planes, and the flexibility, strength, and reach for many tasks. It can perform roll, pitch, and yaw movement of a robotic tool, or "end effector," which interacts with a workpiece.

In many applications, it is necessary or desirable to monitor the forces between an end effector and a workpiece. For example, in "force control" tasks, the end effector is controlled to apply a predetermined force (or force within a predetermined range), requiring the contact force and/or torque to be measured and fed back to the robot control system. There are two conventional approaches to measuring forces and torques at the end of a 6-DOF robot: placing a 6-axis force/torque sensor between the robot and end effector; and measuring torques at each of numerous joints of the robot, and calculating the resulting forces and torques at the end.

U.S. Pat. No. 10,422,707, assigned to the assignee of the present application and incorporated herein by reference in its entirety, describes a compact 6-axis force/torque sensor. The sensor is based on a conventional design comprising a hub (connected to the tool) connected to an annular ring (connected to the robot) by a plurality of deformable beams, which include flexures to increase the beams' deformation under load. Strain gages affixed to the deformable beams measure tension and compression in the beams' surfaces as they deform under applied loads, and strain gage circuit outputs are decoded and mapped to six forces (Fx, Fy, Fz) and six torques (Tx, Ty, Tz) via a decoupling matrix developed during a calibration procedure. In general, a minimum of six strain gages are required, and many designs utilize many more strain gages (for example, mounting them to opposite sides, or all four sides, of each deformable beam). Also, as described in the '707 patent, one or more non-stressed strain gages may also be used to provide a baseline for temperature compensation, to reduce errors introduced by thermal drift. Due to the large number of strain gages and other instrumentation electronics, conventional 6-axis force/torque sensors are expensive.

Robot joint torques can be estimated from motor currents. However, these results tend to be noisy. Alternatively, a joint torque sensor can be installed in each of several joints. Joint torque sensors tend to have higher accuracy and higher signal to noise ratio. Conventional joint torque sensors may follow the 6-axis force/torque sensor design described above, with adjustments to the sensor geometry and/or strain gage placement based on the requirement that only one torque (Tz) must be measured.

Known joint torque sensors have numerous deficiencies. They are usually sensitive to off-axis loads. That is, forces and torques other than the desired Tz will cause beam deformation and generate strain gage output, which may manifest as errors in the axial torque Tz measurement. Known joint torque sensor designs are also sensitive to torque ripple, which is often found when measuring torques close to strain wave gearboxes, also known as harmonic drives. The torque ripple is a periodic fluctuation in the torque measurement, which is difficult to compensate. Even after modifying the 6-axis force/torque sensor design to measure only axial torque Tz, the sensors, with precisely machined thin features (e.g., flexures) and numerous strain gages, are still expensive to manufacture. Because several of them are needed to instrument a 6-DOF robot arm, this approach remains cost-prohibitive in many applications.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a torque sensor comprises transducer plate comprising a center area and periphery, connected by a plurality of spokes and instrumentation beams. The spokes and instrumentation beams of the transducer plate are designed to allow for significant mechanical compliance only when an axial torque is applied. One embodiment employs single-surface strain gage placement on instrumentation beams to detect deformation caused by axial torques, although other embodiments employ side beam strain gage placement. The spokes and instrumentation beams connect the center area and periphery directly, without intervening flexures. The instrumentation beams may be asymmetric, allowing gages to be placed in regions of high sensitivity to axial torques and low sensitivity to off-axis loads, without placing the strain gages on a neutral axis. The strain gage responses from some off-axis loads are designed to be coupled to, or linearly dependent on, the strain gage responses of other off-axis loads. This reduces the number of strain gages need to at least partially resolve all loads. The spokes are cost-effectively formed by removing adjacent transducer plate material in simple shapes, such as through-holes and/or arc slots. The instrumentation beams are similarly formed by removing transducer plate material in radial slots. A straight edge of a radial slot adjacent a convex, arcuate edge of a hole or arc slot yields an asymmetric beam shape. The strain gages may be connected in a variety of configurations, such as Wheatstone quarter-, half-, or full-bridge topologies.

One embodiment relates to a torque sensor configured to measure an axial torque between first and second objects. The sensor includes a generally circular, generally planar transducer plate having a center area with a perpendicular center axis z, and a periphery. One or more first mounting holes are proximate the center area and configured to be attached to the first object. One or more second mounting holes are proximate the periphery and configured to be attached to the second object. A plurality of voids is formed through the transducer plate between the center area and periphery, wherein adjacent voids define spokes connecting the center area and periphery. One or more radial slots are formed through the transducer plate between the center area and periphery, each adjacent at least one void. The transducer plate between a radial slot and a void defines an instrumentation beam connecting the center area and periphery. A strain gage is attached to an instrumentation beam. A strain gage circuit is connected to the strain gage, and configured to output a voltage dependent on a strain-dependent resistance of the strain gage.

Another embodiment relates to a torque sensor. The sensor comprises a transducer plate having an axis and configured to be attached between first and second objects, and four strain gages attached to the transducer plate, wherein each strain gage is connected to a strain gage circuit. The transducer plate configuration, strain gage placement, and strain gage circuits are such that a strain gage response for two different pairs of force and torque are each linearly dependent, whereby the strain gage response under the force of each pair differs from strain gage response under the torque of that pair by a multiple, and the four strain gage circuit outputs comprise a four by four linear system, from which at least a torque about the axis is directly determined from the strain gage responses and a decoupling matrix.

Yet another embodiment relates to a method of manufacturing a torque sensor. A generally circular, generally planar transducer plate having a center area with a perpendicular center axis z, and a periphery, is provided. One or more first mounting holes are formed proximate the center area, the first mounting holes configured to be attached to a first object. One or more second mounting holes are formed proximate the periphery, the second mounting holes configured to be attached to a second object. A first plurality of voids is formed through the transducer plate between the center area and periphery, wherein adjacent voids define spokes connecting the center area and periphery. One or more radial slots are formed through the transducer plate between the center area and periphery, each radial slot adjacent at least one void, wherein the transducer plate between a radial slot and a void defines an instrumentation beam connecting the center area and periphery. A strain gage is attached to an instrumentation beam. The strain gage is connected to a strain gage circuit outputting a voltage dependent on a strain-dependent resistance of the strain gage.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Although embodiments of the present invention are particularly suited for deployment as robot joint torque sensors, those of skill in the art will readily recognize that the application is largely independent of the joint torque sensor design and instrumentation. Accordingly, embodiments of the present invention described herein refer to a "torque sensor," configured to measure an axial torque Tz between two objects. In the robot joint torque sensor application, the objects connected to the torque sensor may be a first segment of a 6-DOF robot arm (or any object rigidly attached thereto) and an actuator, such as a motor, that rotationally moves a second segment of the robot arm relative to the first segment.

The use of strain gages in force and torque sensors is well known. Strain gages, and in particular silicon strain gages, exhibit a strain-dependent resistance due to changes in their length when attached to surfaces that experience expansion or compression. A strain gage circuit, such as some configuration of a Wheatstone bridge circuit, outputs a voltage that can be used quantify the resistance of the strain gage. As used herein, a "strain gage response" refers to the difference in output voltage of a strain gage circuit between an unloaded state, and under an applied mechanical load. As known in the art, comparing the responses of a plurality of strain gages placed in various locations and orientations on a sensor body can yield information about the loads applied to the sensor. The mathematical construct used for such disambiguation is referred to herein as a decoupling matrix. A decoupling matrix is typically determined during a calibration procedure.

A known problem in the prior art of torque sensor design is decoupling strain gage response due to axial torque, from strain gage response due to other forces and torques, referred to collectively herein as "off-axis loads." Such decoupling has been attempted in the prior art primarily by gage placement, the use of flexures, circuit design, and software.

One known approach is to place strain gages where they are insensitive, or at least less sensitive, to off-axis loads. This is generally accomplished by placing gages on the neutral axis of deformable beams. In most prior art torque sensors, the strain gages are placed on the sides of deformable beams, where the surface tension and compression of the beams is maximized under axial torque loads. In sensors that use single-surface gaging—wherein all strain gages are on the same surface of their respective deformable beams (such as the above-incorporated '707 patent)—the strain gages are generally sensitive to strains from all forces and torques applied to the sensor. Single-surface gaging is attractive, however, because it may reduce the number of strain gages required, and it dramatically lowers manufacturing costs, as placement and attachment of the strain gages is much easier.

Another approach is to use series flexures. Flexures are structural members that are much less stiff than the rest of the sensor, which allows for compliance in specific directions, thus reducing undesired strains on the gages. In torque sensors, series flexures are usually placed between the deformable beam (which is itself a relatively stiff flexure) carrying strain gages and the outer hub of the sensor. Due to the thin width of series flexures and the precise machining required, sensors with series flexures tend to be expensive to manufacture.

In some torque sensors, strain gages which independently detect off-axis loads are cancelled, or at least mitigated, by pairing with other gages in a Wheatstone half- or full-bridge circuit topology. Finally, for strain gages which sense multiple forces and torques, the effects of off-axis loads are mitigated or removed by mapping the strain gage signals to force and torque measurements using a decoupling matrix.

Figure 1:
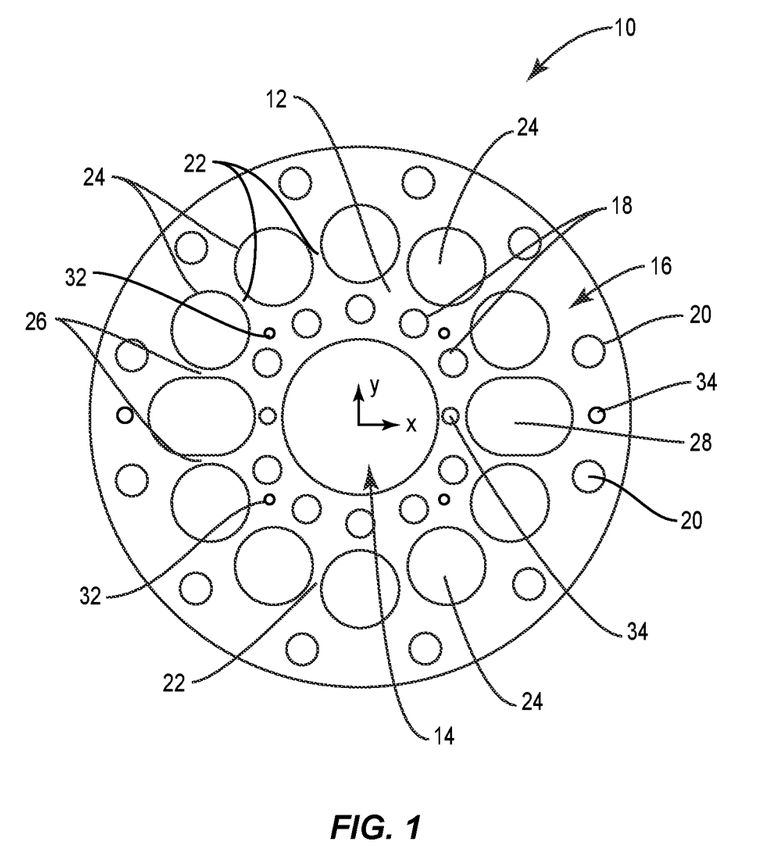
FIG. 1 is a plan view of a torque sensor according to one embodiment.

FIG. 1 depicts a torque sensor 10 according to one embodiment of the present invention. The torque sensor 10 utilizes a unique mechanical design without series flexures; single-surface gaging; strategic gage placement; quarter-bridge circuit topology; and a decoupling matrix, to measure axial torque Tz while mitigating the effects of off-axis loads. The torque sensor 10 comprises a transducer plate 12 that is generally circular, and generally planar. For compactness and cost-effectiveness, in one embodiment it is milled, or otherwise formed, as a single plate of metal.

The transducer plate 12 includes a center area 14 which, in the embodiment depicted, comprises a central hole allowing for the passage of mechanical, electrical, pneumatic, etc. utilities between robot arm segments. In other embodiments, the center area 14 may be solid or comprise only a single mounting hole. A central axis z, perpendicular to the plane of the transducer plate 12, passes through the center. The transducer plate 12 also includes a periphery 16. First mounting holes 18 are formed in or proximate to the center area 14, and configured to attach the torque sensor 10 to a first object. Second mounting holes 20 are formed at or proximate to the periphery 16, and configured to attach the torque sensor 10 to a second object. The torque sensor 10 is optimized to measure an axial torque Tz between the first and second objects, while minimizing the deleterious effects of off-axis loads.

A plurality of spokes 22 connect the center area 14 to the periphery 16. In the embodiment depicted in FIG. 1, the spokes 22 are formed by forming a plurality of voids 24, such that the material of the transducer plate 12 between adjacent voids 24 forms spokes 22. In the embodiment depicted in FIG. 1, the voids 24 are through-holes drilled through the transducer plate 12, which are very easy and inexpensive to produce during manufacture, although in general, the voids 24 are not limited to through-holes. In one embodiment, each spoke 22 comprises two concave, arcuate sides.

Two radial slots 28 are also formed through the transducer plate 12 between the center area 14 and periphery 16. Each radial slot 28 is adjacent one or more voids 24, such that the material of the transducer plate 12 between a radial slot 28 and adjacent void 24 forms an instrumentation beam 26. In the embodiment of FIG. 1, where the voids 24 are through-holes, each instrumentation beam 26 comprises a straight edge on one side, and a concave arcuate edge on the other side—although this configuration is not a limitation of embodiments of the present invention. The instrumentation beams 26 do not include thin features, simplifying and reducing the cost of manufacture of the torque sensor 10.

Figure 5:
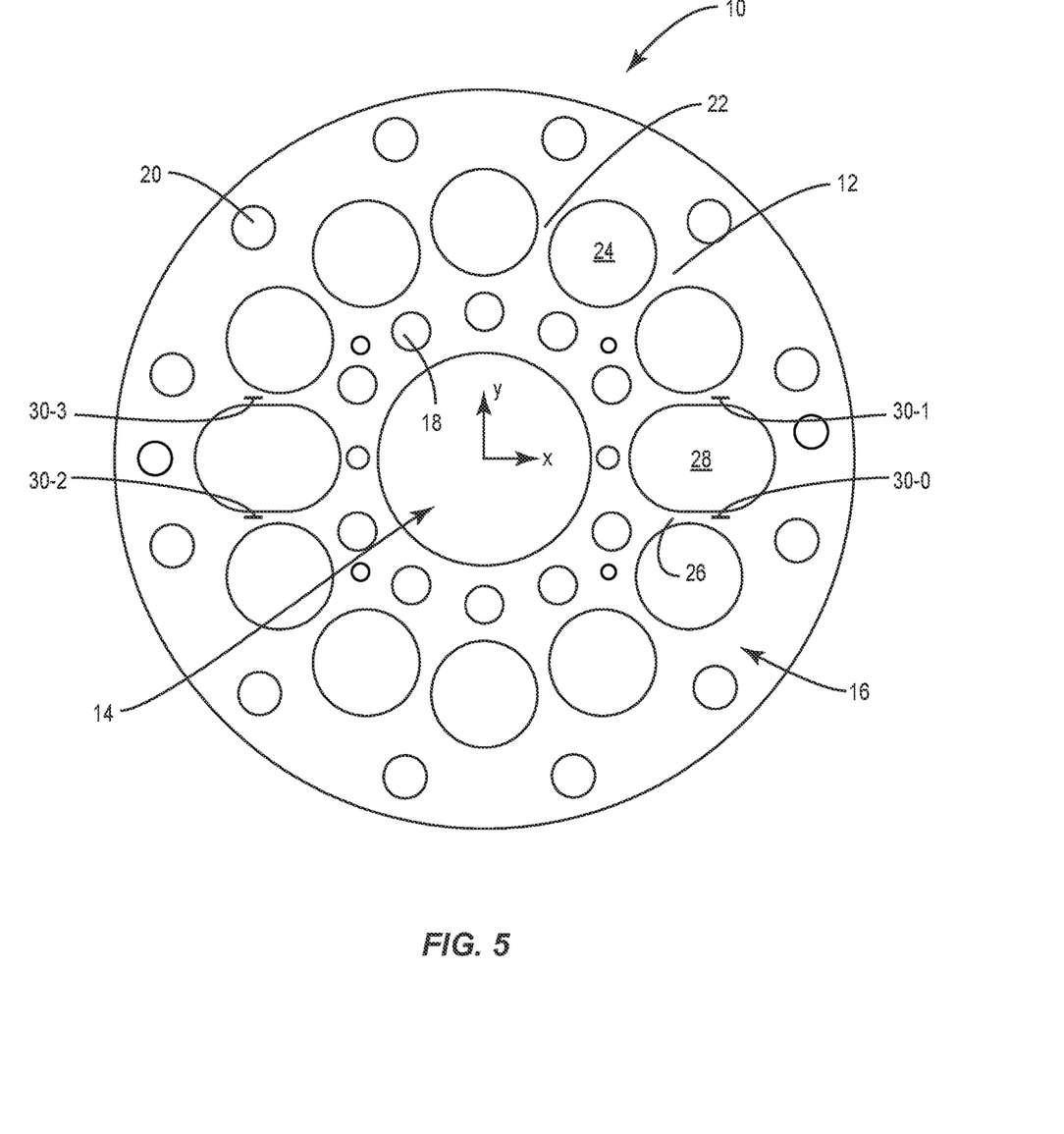
FIG. 5 is a plan view of a torque sensor showing single-surface strain gage placement.

As shown in FIG. 5, a strain gage 30 is mounted on each instrumentation beam 26. In the embodiment depicted in FIG. 1, because the radial slots 28 have generally straight sides (in the radial direction) and adjacent voids 24 have curved sides, the instrumentation beams 26 are asymmetric, and strains from applied loads are concentrated, or non-uniform, radially along the instrumentation beams 26. As described more fully herein, the strain gages 30 are attached to the instrumentation beams 26 in areas that experience large stresses from axial torque Tz, but little stresses from off-axis torques Tx, Ty, which mitigates the deleterious effects of off-axis loads on axial torque Tz measurement.

The transducer plate 12—with spokes 22 and instrumentation beams 26 connecting the center area 14 and periphery 16—exhibits slight mechanical compliance, or deformation, under axial torque Tz. However, the transducer plate 12 exhibits a much higher relative stiffness under off-axis loads. As such, the transducer plate 12 resists deformation out of its plane (e.g., under off-axis torques Tx, Ty) or forces attempting to move the center area 14 toward or away from the periphery 16 in any radial direction (e.g., off-axis forces Fx, Fy), or move them apart in the axial direction (Fz).

As those of skill in the art will readily appreciate, the torque sensor 10 may include additional features. For example, FIG. 1 depicts electronics mounting holes 32, which provide protected spaces for electronic components such as fixed resistors, Analog to Digital Converters, microprocessors, memory, and the like. Additionally, FIG. 1 depicts positioning dowel holes 34, which accept corresponding dowels to ensure proper positioning and alignment of the torque sensor 10 when assembled into, e.g., a robot arm.

The formation of spokes 22 by drilling adjacent voids 24, and the formation of instrumentation beams 26 by forming radial slots 28 adjacent voids 24, results in a compact transducer plate 12 having the desired, targeted compliance and stiffness described above, while being simple and inexpensive to manufacture. However, those of skill in the art will readily recognize that embodiment of the torque sensor 10 are not limited to the particular transducer plate 12 depicted in FIG. 1.

Figure 2A:
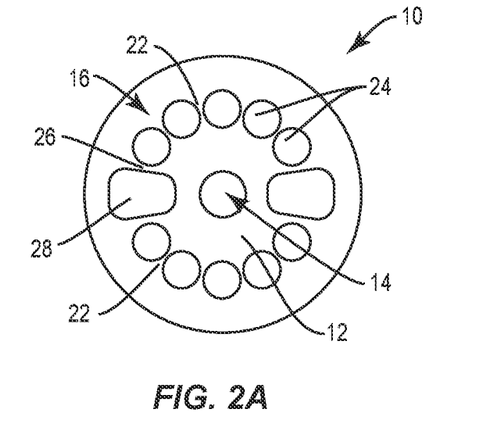
FIGS. 2A-2D are simplified plan views of torque sensors according to different embodiments.
Figure 2B:
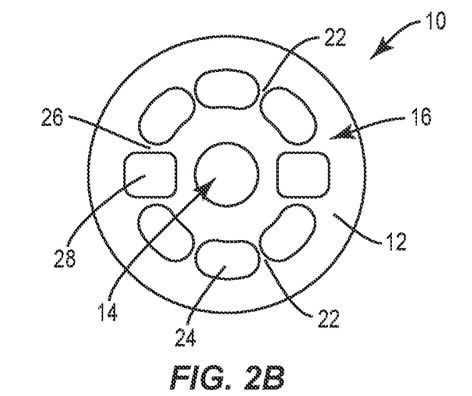
Figure 2C:
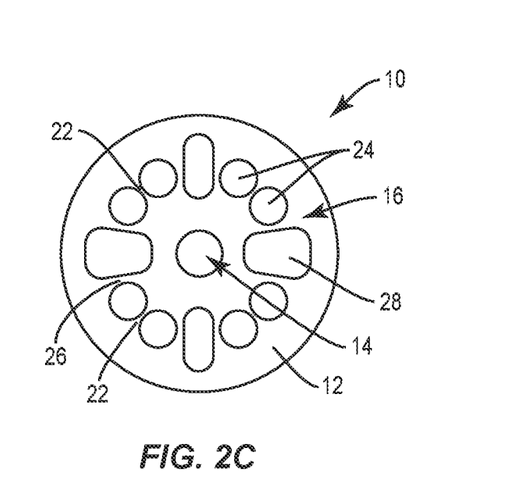
Figure 2D:
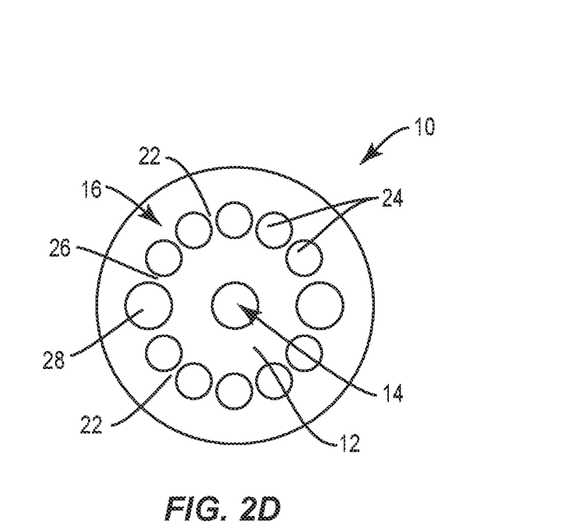

FIGS. 2A-2D depict alternative designs of transducer plates 12 for different embodiments of torque sensors 10. For simplicity, FIGS. 2A-2D show only the voids 24, forming spokes 22, and radial slots 28, defining instrumentation beams 26 along with adjacent voids 24. The mounting holes 18, 20, and other features, are omitted. The voids 24 may be simple through-holes, as depicted in FIGS. 1, 2A, 2C, and 2D; they may be arc slots, as depicted in FIG. 2B; or they may be any other shape. Similarly, the radial slots 28 may be rectangular, with parallel radial sides, as depicted in FIGS. 1 and 2B. Alternatively, the radial sides may be non-parallel (e.g., aligned with actual radii), as depicted in FIG. 2A. Note that FIG. 2C depicts both types of radial slots 28. Other shapes are possible within the broad scope of the present invention. For example, in FIG. 2D, the radial slots 28 are through-holes, and the instrumentation beams 26 include concave arcuate edges on both sides.

The spokes 22, formed between voids 24, are most flexible under axial torque Tz. The spokes 22 add stiffness under off-axis loads (i.e., forces Fx, Fy, Fz and torques Tx, Ty). This reduces the influence of off-axis loads on the measurement of axial torque Tz. The spokes 22 are depicted in FIGS. 1, 2A, 2C, and 2D as formed from voids 24 in the form of through-holes. This contributes to cost reduction and ease of manufacturability. However, embodiments of the present invention are not limited to this shape. As depicted in FIG. 2B, arc slots provide additional design flexibility, without significant increase in cost of manufacture. The lack of thin features additionally contributes to cost reduction and ease of manufacture. Although the torque sensor 10 will function with zero spokes 22 — that is, no voids 24 formed in the transducer plate 12 — about four to ten spokes provide desirable sensitivity under axial torque Tz, and stiffness in off-axis loads Fx, Fy, Fz, Tx, and Ty.

Figure 3:
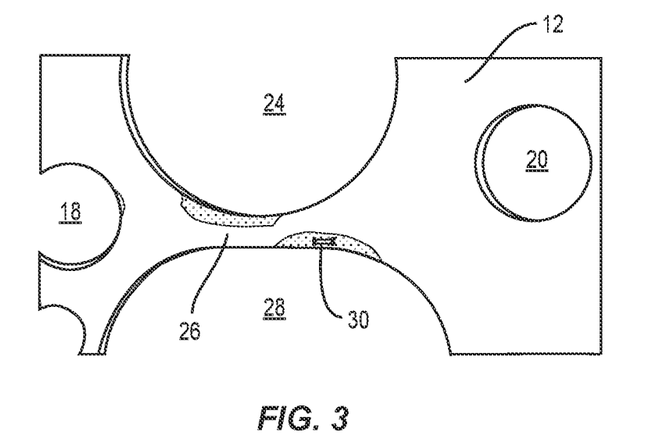
FIG. 3 is an enlarged view of an instrumentation beam, showing tension strain under an axial torque Tz.

FIG. 3 is an enlarged view of an instrumentation beam 26. Although the instrumentation beams 26 depicted herein generally have one straight side (a side of a radial slot 28) and one arced side (a side of a through-hole void 24), this is not a limitation of embodiments of the present invention. The void 24 and radial slot 28 preferably form an asymmetric instrumentation beam 26. As FIG. 3 depicts, the asymmetry of the instrumentation beam 26 in the radial direction results in a concentration of strain (depicted as shaded) for applied axial torque Tz. The strain gage 30 is attached to the instrumentation beam 26 at the location of the greatest strain resulting from axial torque Tz.

Figure 4A:
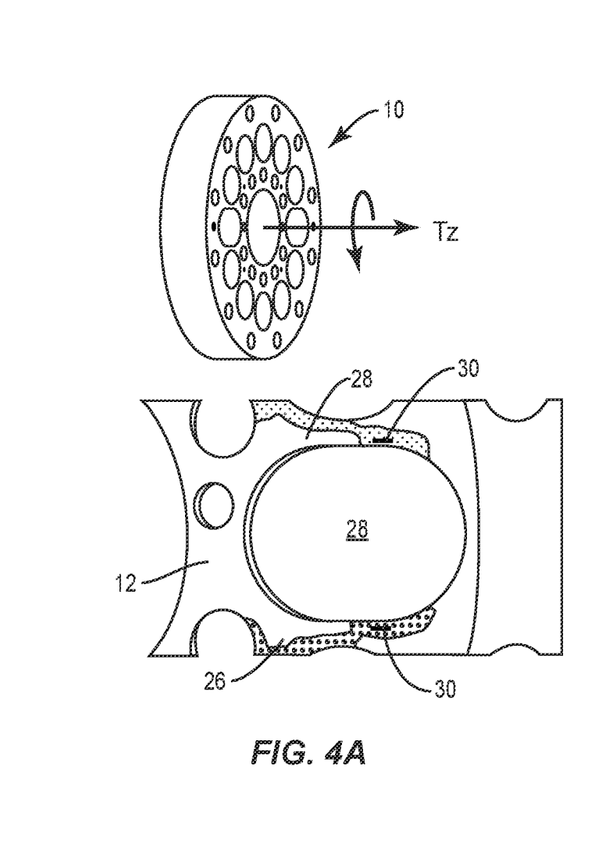
FIG. 4A is a diagram of axial torque Tz and an enlarged view of two instrumentation beams, showing tension and compression strains.

FIG. 4A depicts the placement of strain gages 30, and the distribution of strain in an instrumentation beam 26 when the torque sensor 10 experiences an axial torque Tz. The area shaded with small dots is in tension, and the area shaded with larger dots is in compression—although the strains would be opposite for an axial torque in the opposite direction. The strain gages 30 are placed along the instrumentation beam 26 in areas that experience maximum strain under axial torque Tz.

Figure 4B:
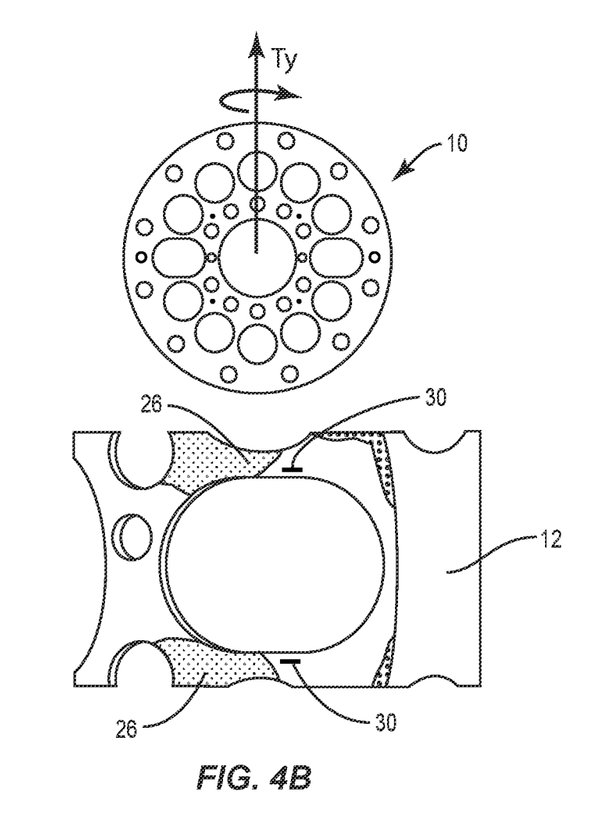
FIG. 4B is a diagram of a bending torque Ty and an enlarged view of two instrumentation beams, showing tension and compression strains.

As seen in FIG. 4B, the distribution of strain is significantly different under a plane-bending torque Ty. Here also, the area shaded with small dots is in tension, and the area shaded as with larger dots is in compression for the particular direction of Ty depicted. The placement of the strain gages 30 is such that they experience little of this strain, and hence generate minimal output for this off-axis load.

Accordingly, in some embodiments, the strain gages 30 are attached to the instrumentation beam 26 at a location that is simultaneously the site of greatest strain under Tz and least strain under Tx, Ty. This is significant, because in single-surface gage placement, all strain gages tend to generate a response to all applied loads. In these embodiments, the design of the transducer plate 12 and placement of the strain gages 30 contribute significantly to mitigation of the deleterious effects of off-axis loads in measuring axial torque Tz. In the embodiment depicted, the strain gage 30 mounting location is along a straight edge of the radial slot 28, which also eases manufacturing by providing a reference for orientation of the strain gages 30. The lack of thin series flexures additionally aids manufacturability and cost reduction.

FIG. 5 shows the placement of four strain gages 30 on the torque sensor 10 according to one embodiment. As in FIGS. 4A and 4B, in this embodiment, strain gages 30-0, 30-1, 30-2, and 30-3 are each attached to the same (upper) side of different instrumentation beams 26, at locations that experience maximum strain under axial torque Tz but minimum strain under bending torques Tx, Ty. Mounting all four strain gages 30 to the upper surface greatly eases manufacture. As described more fully herein, the design of the transducer plate 12, and placement of the strain gages 30, as depicted in FIG. 5 results in linear dependence between off-axis loads Fx and Ty, as well as between Fy and Tx. This reduces the number of strain gages 30 required to measure Tz from six, as required for single-surface mounting in the prior art, to only four. This further reduces costs and manufacturing complexity.

Figure 6:
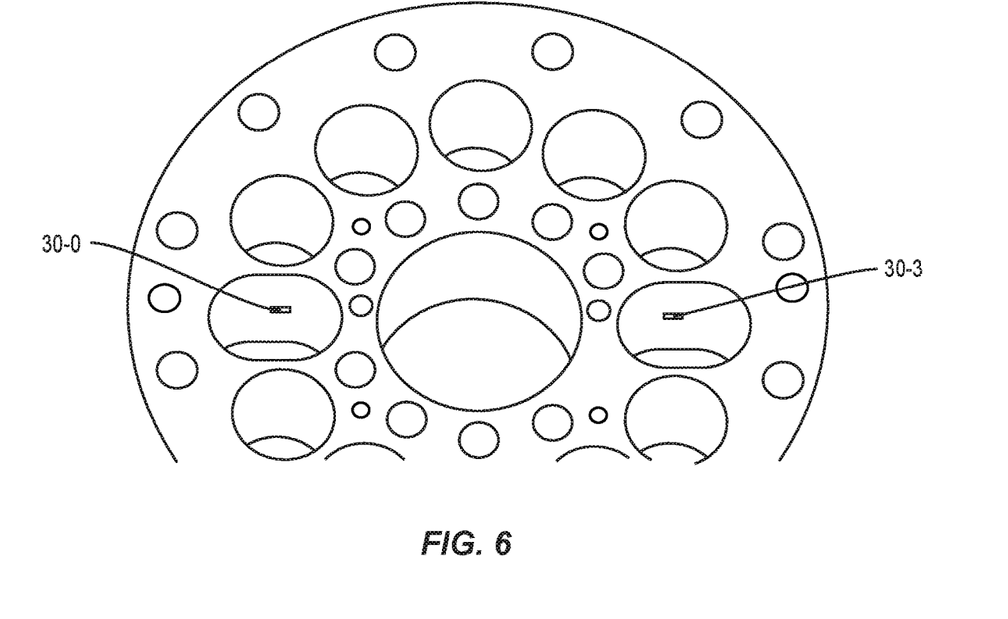
FIG. 6 is a partial perspective view of a torque sensor showing neutral axis strain gage placement on a radial slot interior surface.

However, the present invention is not limited to single-surface strain gage 30 mounting. FIG. 6 depicts strain gages 30-0 and 30-3 attached to the sides of instrumentation beams 26 that form the interior sides of the radial slots 28 (corresponding strain gages 30-1 and 30-2 are similarly mounted to the inner surfaces of the radial slots 28 not visible in FIG. 6). In this embodiment, each strain gage 30-0, 30-1, 30-2, and 30-3 is attached to a different instrumentation beam 26, and it is attached along the neutral axis of that surface of the instrumentation beam 26. The neutral axis of an instrumentation beam 26 is the line that experiences no strain, when one side of the surface is in tension and the other side is in compression. In this location, the strain gages 30 primarily respond to strains aligned longitudinally along the surface of the instrumentation beam 26. Accordingly, in this embodiment, the torque sensor 10 is less sensitive to off-axis loading (i.e., Fz, Tx, Ty) than the embodiment depicted in FIGS. 4A, 4B, and 5. However, mounting the strain gages 30 at these locations is more difficult, and hence adds cost to manufacturing.

Figure 7:
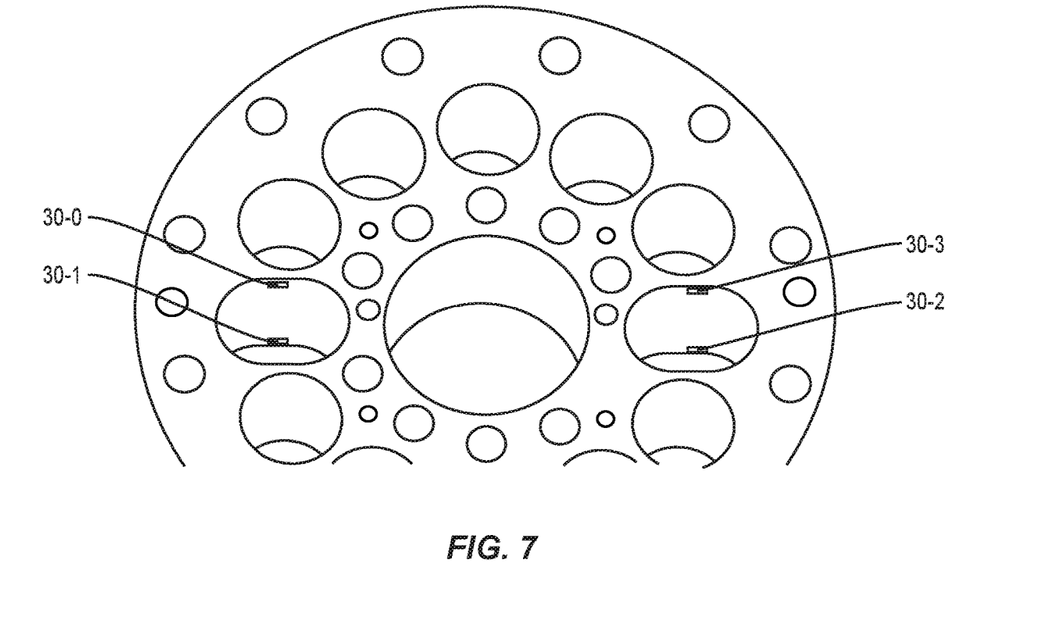
FIG. 7 is a partial perspective view of a torque sensor showing non-neutral axis strain gage placement on a radial slot interior surface.

In yet another embodiment, depicted in FIG. 7, two strain gages 30 are attached to an interior surface of each of two instrumentation beams 26, spaced apart from the neutral axis. In this placement, the strain gages 30 generate outputs for applied loads that place differing strains on the inner surface of the radial slots 28. Similar to the embodiment of FIG. 6, in this embodiment, the torque sensor 10 is less sensitive to off-axis loading (i.e., Fz, Tx, Ty) than the embodiment depicted in FIGS. 4A, 4B, and 5. However, mounting the strain gages 30 at these locations is also more difficult, and hence adds cost to manufacturing.

In general, as few as one strain gage 30 will yield a functional torque sensor 10; however, there is no way to compensate for the strain gage 30 output due to off-axis loading. Generally, adding more strain gages 30 increases the accuracy and resolution of the torque sensor 10, and, along with transducer plate 12 design and strain gage placement considerations, allows for off-axis loads to be eliminated or mitigated from the axial torque Tz measurement. For example, more than four strain gages 30 may result in increased sensitivity; on the other hand, additional strain gages 30 add cost. As discussed in the above-incorporated '707 patent, a strain gage 30 may be mounted to a non-stressed member of the torque sensor 10, the output of which may be used to compensate for variations in strain gage 30 output with changes in temperature.

One novel concept of the present invention, which is not limited to torque sensors and not limited to any particular embodiment described herein, is strain gage 30 response coupling. As used herein, response "coupling" refers to a force/torque sensor design—including the mechanical features of the sensor body, the placement of strain gages on the sensor body, and the strain gage circuits from which gage responses are obtained—in which the strain gage response under one force or torque is linearly dependent to the strain gage response from another torque or force. Two strain gage responses are coupled when the strain gage response vector of one is a multiple of the strain gage response vector of the other. Strain gage responses are linearly dependent when one strain gauge response vector is a multiple of one or more different strain gage response vectors.

In embodiments of the present invention, strain gage 30 response coupling reduces the number of strain gages 30 required to independently measure axial torque Tz from the conventional requirement of six strain gages 30 to only four, even where the four strain gages 30 are sensitive to all six forces and torques (such as in single-surface placement).

Table 1 presents a representative example of the outputs of strain gages 30-0 through 30-3 under all six applied forces and torques. A gage signal is the output voltage of a strain gage 30 circuit. A gage response is the change in gage signals between an unloaded state, and a load of the specified magnitude applied in the specified axis.

TABLE 1

Strain Gage Response for Representative Example Loads

| Load Applied | | Gage Response (ΔV) | | | |
|---|---|---|---|---|---|
| Axis | Magnitude | 30-0 | 30-1 | 30-2 | 30-3 |
| Fx | 1N | 1 | 1 | −1 | −1 |
| Fy | 1N | 1 | −1 | −1 | 1 |
| Fz | 1N | 1 | 1 | 1 | 1 |
| Tx | 1 Nm | 5 | −5 | −5 | 5 |
| Ty | 1 Nm | −3 | −3 | 3 | 3 |
| Tz | 1 Nm | 3 | −3 | 3 | −3 |

For example, the Fx gage response vector <1,1,−1,−1> means the output voltage of gage circuits for strain gages 30-0 and 30-1 increased by one volt from an unloaded state to an applied force of 1N along the x-axis, and the output voltage of gage circuits for strain gages 30-2 and 30-3 decreased by one volt for the same change in sensor 10 loading (with no appreciable change in temperature).

In this example, the gage responses for Fy and Tx are coupled, or linearly dependent. The gage response for Tx is five times that of the gage response for Fy, for each strain gage 30. For example, for a force vector <5, 5, 5,5> and with no information as to the load applied, one cannot distinguish whether a 5N force was applied in Fy, or a 1Nm torque was applied in Tx. The force Fy and torque Tx are linearly dependent, or coupled, in that the gage response vector for one is a multiple of the gage response vector for the other.

Note that in this representative example, the gage responses for Fx and Ty are also coupled — they differ by a multiple of −3.

Because two pairs of forces and torques are coupled, they can each be combined, and the gage responses from all applied loads are represented as a four by four linear system — that is, four force/torque loads (individual or coupled) yield four unique strain gage response vectors. This system can be inverted, to map the strain gage response vectors to the forces and torques. Table 2 depicts the four unique gage responses, and the direct or coupled forces and torques giving rise to them.

TABLE 1

Strain Gage Response with Coupled Force/Torque Pairs

| Load Applied | | Gage Response (ΔV) | | | |
|---|---|---|---|---|---|
| Axis | Magnitude | 30-0 | 30-1 | 30-2 | 30-3 |
| Fx, Ty Coupled | Unknown | 1 | 1 | −1 | −1 |
| Fy, Tx Coupled | Unknown | 1 | −1 | −1 | 1 |
| Fz | 1N | 1 | 1 | 1 | 1 |
| Tz | 1 Nm | 3 | −3 | 3 | −3 |

Due to the two pairs of coupled forces/torques, the strain gage 30 responses provide a full rank linear system, where four strain gage 30 response vectors uniquely identify, and at least partially quantify, four mechanical loads: Tz, Fz, FyTx Coupled, and FxTy Coupled. In a torque sensor 10, the axial force and coupled force/torque solutions are ignored, and the desired axial torque Tz is resolved directly by a decoupling matrix. In other applications, where information about the Fz, FyTx Coupled, and/or FxTy Coupled loads may be useful, these can be directly resolved by the decoupling matrix as well—although in the case of the coupled loads, the potential force or torque is identified, but the magnitude cannot be quantified. In some cases, positional information about the robot arm segments can be used to decouple the coupled loads, allowing fuller resolution. Even without such positional information, the axial force Fz is directly and fully resolved, so the torque sensor 10 is effectively a force/torque sensor for the axial (z) axis.

Figure 8A:
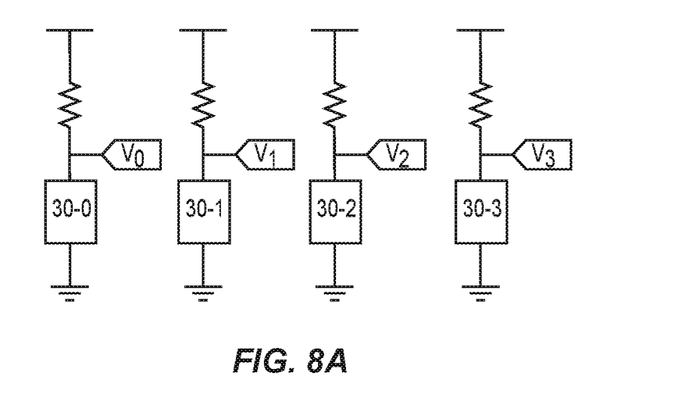
FIG. 8A is an electrical schematic diagram of four Wheatstone quarter-bridge strain gage circuits.

FIG. 8A depicts the four strain gages 30-0, 30-1, 30-2, and 30-3 in Wheatstone quarter-bridge circuits. The strain gages 30 are connected in series with a fixed resistor between a source voltage and ground, and the gage circuit output voltage is taken at the center node. As described above, the gage response thus measured can independently resolve Tz, Fz, FyTx Coupled, and FxTy Coupled. As described in the above-incorporated '707 patent, an unstressed strain gage may be included as a reference for changes in gage output due to temperature. U.S. patent application titled, "Quarter-Bridge Hardware Temperature Compensation for Force/Torque Sensor," filed concurrently herewith, assigned to the assignee of the present disclosure, and incorporated herein by reference in its entirety, describes a system and method of linearizing the operation of strain gages in quarter-bridge circuits by adding and adjusting the values of trimming resistors across load-bearing and unstressed strain gages, which provides a substantially flat strain gage response across a predetermined temperature range. The quarter-bridge configuration also allows for compensation of preload. For example, if an off-axis load is applied to the torque sensor prior to the axial torque to be measured, outputs of the quarter-bridge gage circuits can resolve both the preload and the axial torque, increasing the accuracy of the latter measurement.

Figure 8B:
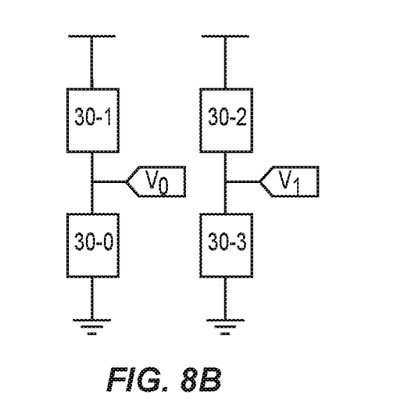
FIG. 8B is an electrical schematic diagram of two Wheatstone half-bridge strain gage circuits.

The quarter-bridge configuration is not the only circuit topology useful in embodiments of the present invention. FIG. 8B depicts the strain gages 30-0, 30-1, 30-2, and 30-3 in Wheatstone half-bridge circuits. This circuit is more stable over temperature than the quarter-bridge circuits of FIG. 8A. However, it cannot independently resolve Tz and Fz simultaneously, and is sensitive to gain changes caused by sensor preloading.

Figure 8C:
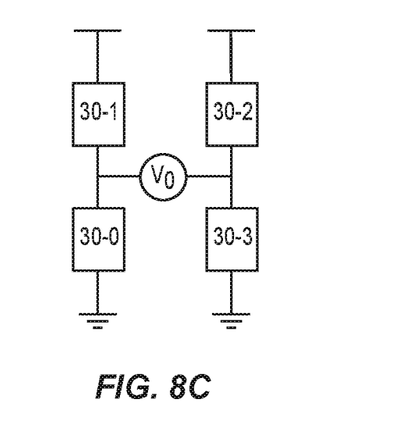
FIG. 8C is an electrical schematic diagram of a Wheatstone full-bridge strain gage circuit.

FIG. 8C depicts the strain gages 30-0, 30-1, 30-2, and 30-3 in a Wheatstone full-bridge circuit. This circuit is also more stable over temperature than the quarter-bridge circuits of FIG. 8A. However, it cannot independently resolve Tz and Fz simultaneously, and is sensitive to gain changes caused by sensor preloading.

Figure 9:
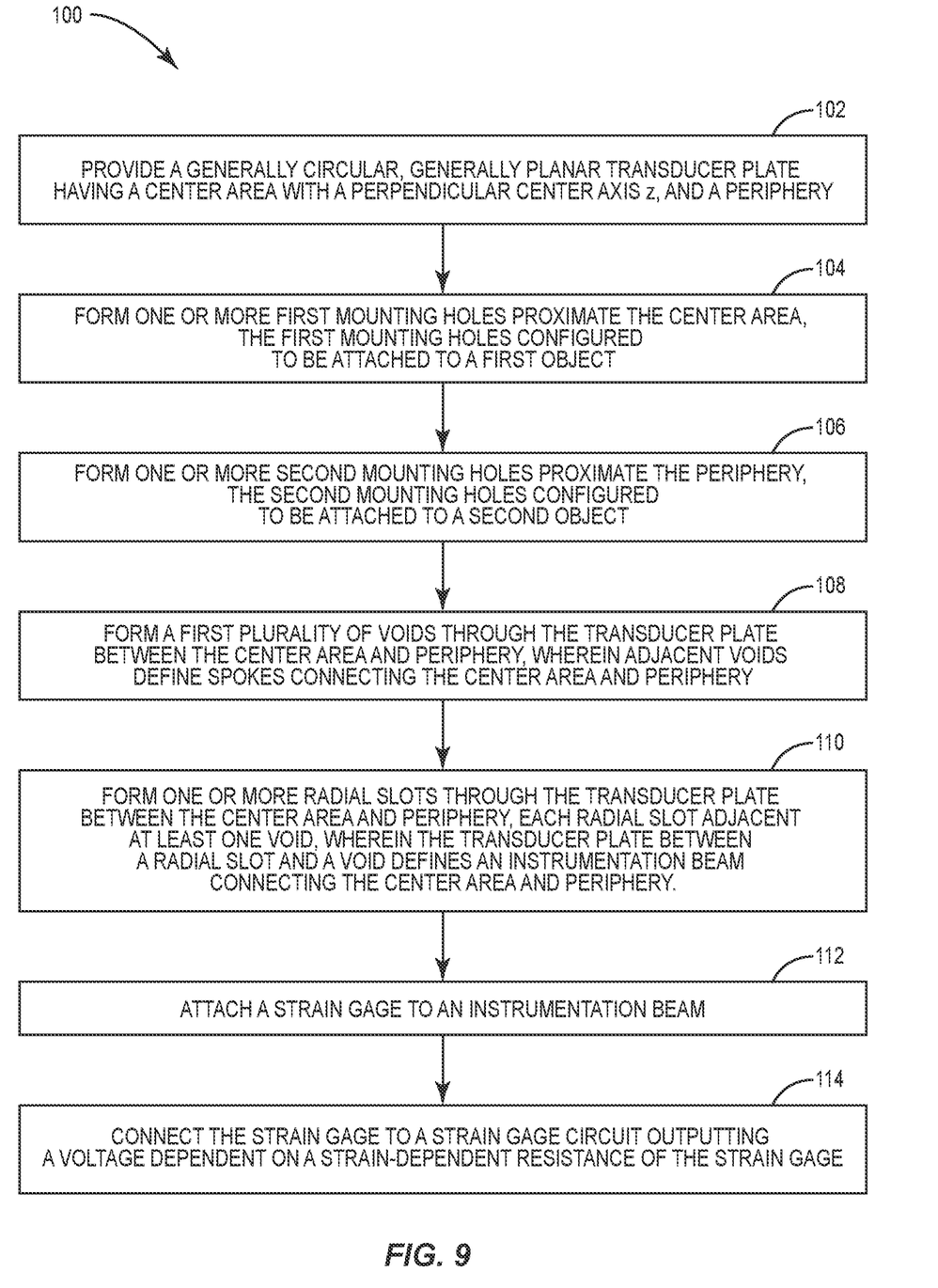
FIG. 9 is a flow diagram of the steps in a method of manufacturing a torque sensor.

FIG. 9 depicts the steps in a method 100 of manufacturing a torque sensor 10 according to embodiments of the present invention. A generally circular, generally planar transducer plate 12 is provided (block 102). The transducer plate 12 has a center area 14 with a perpendicular center axis z, and a periphery 16. One or more first mounting holes 18 are formed proximate the center area 14 (block 104). The first mounting holes 18 are configured to be attached to a first object (such as a first segment of a robot arm). One or more second mounting holes 20 are formed proximate the periphery 16 (block 106). The second mounting holes are configured to be attached to a second object (such as a motor controlling motion between the first segment of the robot arm and a second segment of the robot arm). A plurality of voids 24 is formed through the transducer plate 12 between the center area and periphery (block 108). Adjacent voids 24 define spokes 22 connecting the center area 14 and periphery 16. One or more radial slots 28 are formed through the transducer plate 12 between the center area 14 and periphery 16 (block 110). Each radial slot 28 is adjacent at least one void 24. The transducer plate 12 between a radial slot 28 and a void 24 defines an instrumentation beam 26 connecting the center area 14 and periphery 16. A strain gage 30 is attached to an instrumentation beam 24 (block 112). The strain gage 30 is connected to a strain gage circuit outputting a voltage dependent on a strain-dependent resistance of the strain gage 30 (block 114).

Embodiments of the present invention present numerous advantages over the prior art. The design of the transducer plate 12 enables a torque sensor 10 that is compliant to axial torque but exhibits high relative stiffness to off-axis loads, making the sensor 10 much less sensitive to the deleterious effects of off-axis loads. In one embodiment, strain gages 30 are mounted to the top surface of the transducer plate 12 only, making it is less expensive to manufacture. The transducer plate 12 employs a simple geometry and easily-formed voids 24 and axial slots 28, for ease of manufacture. The resulting spokes 22 and instrumented beams 26 do not employ complex, expensive thin features. The instrumented beams 26 are asymmetrical, creating locations that are insensitive to strains caused by off-axis loads, allowing for top-surface gaging that is nearly insensitive to bending torques Tx, Ty. The transducer plate 12 allows for a large central through-hole, for the passage of utilities or mechanical couplings between robot arm segments. The transducer plate 12 design, strain gage 30 placement, and in one embodiment quarter-bridge circuit topology, allow for direct resolution of axial torque Tz (and, if desired, Fz, FyTx Coupled, and FxTy Coupled), using only four strain gages 30.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa.

As used herein, the term "configured to" means set up, organized, adapted, or arranged to operate in a particular way; the term is synonymous with "designed to." As used herein, the term "substantially" means nearly or essentially, but not necessarily completely; the term encompasses and accounts for mechanical or component value tolerances, measurement error, random variation, and similar sources of imprecision. As used herein, the term "generally circular" refers to a shape having a center area and periphery roughly equidistant from the center, but is not necessarily limited to a geometric circle. For example, a hexagon, octagon, and the like are polygons that are "generally circular." As used herein, the term "generally planar" refers to a shape having opposed planar surfaces, but does not exclude non-planar features, such as a rim, lip, flange, or the like.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A torque sensor configured to measure an axial torque between first and second objects, comprising:
   a generally circular, generally planar transducer plate having a center area with a perpendicular center axis z and a periphery;
   one or more first mounting holes proximate the center area and configured to be attached the first object;
   one or more second mounting holes proximate the periphery and configured to be attached to the second object;
   a plurality of voids through the transducer plate between the center area and periphery, wherein adjacent voids define spokes connecting the center area and periphery;
   one or more radial slots through the transducer plate between the center area and periphery, each adjacent at least one void, wherein the transducer plate between a radial slot and a void defines an instrumentation beam connecting the center area and periphery, each instrumentation beam oriented generally radially along its entire length, and having the same thickness as the transducer plate along its entire length;
   a strain gage attached to an instrumentation beam; and
   a strain gage circuit connected to the strain gage and configured to output a voltage dependent on a strain-dependent resistance of the strain gage.

2. The sensor of claim 1, wherein at least one void is a through hole.

3. The sensor of claim 1, wherein at least one void is an arc slot.

4. The sensor of claim 1, wherein two sides of at least one radial slot are parallel in the radial direction.

5. The sensor of claim 1, wherein two sides of at least one radial slot is non-parallel in the radial direction.

6. The sensor of claim 1, wherein at least one radial slot is a through hole.

7. The sensor of claim 1, wherein the transducer plate exhibits greater mechanical compliance under torque about the axis Tz than under any other force Fx, Fy, Fz or torque Tx, Ty.

8. The sensor of claim 1 wherein the sensor comprises at least four strain gages, each attached to a separate instrumentation beam.

9. The sensor of claim 8 wherein the strain gages are all attached to a same side of their respective instrumentation beams.

10. The sensor of claim 8 wherein each strain gage is attached to a side of its respective instrumentation beam that is an interior side of a radial slot.

11. The sensor of claim 10 wherein each strain gage is attached to a respective instrumentation beam along a neutral axis of the interior side of a radial slot.

12. The sensor of claim 10 wherein each strain gage is attached to a respective instrumentation beam offset from a neutral axis of the interior side of a radial slot.

13. The sensor of claim 8 wherein a first two forces or torques are coupled such that a strain gage response one of the first two forces or torques is a multiple of the strain gage response under the other of the first two forces or torques.

14. The sensor of claim 13 wherein a different, second, two forces or torques are coupled such that the strain gage response under one of the second two forces or torques is a multiple of the strain gage response under the other of the second two forces or torques.

15. The sensor of claim 14 wherein the four strain gage responses and individual and coupled loads comprise a four by four linear system and wherein a torque about the axis Tz is directly determined from the four strain gage responses and a decoupling matrix.

16. The sensor of claim 15 wherein a force parallel with the axis Fz is also directly determined from the four strain gage responses and the decoupling matrix.

17. The sensor of claim 1 wherein the torque sensor is a robot joint torque sensor, and wherein the first object is an actuator of a joint between two segments of a robot arm, and the second object is rigidly attached to one of the segments.

18. A torque sensor, comprising:
a transducer plate having an axis and configured to be attached between first and second objects; and
four strain gages attached to the transducer plate, each strain gage connected to a strain gage circuit;
whereby the transducer plate configuration, strain gage placement, and strain gage circuits are such that a strain gage response for two different pairs of force and torque are each linearly dependent, whereby the strain gage response under the force of each pair differs from strain gage response under the torque of that pair by a multiple, and the four strain gage responses comprise a four by four linear system, from which at least a torque about the axis is directly determined from the strain gage responses and a decoupling matrix.

19. The sensor of claim 18 wherein a strain gage response is a difference in an output voltage of a corresponding strain gage circuit between unloaded and loaded conditions.

20. The sensor of claim 18 wherein the transducer plate exhibits compliance under axial torque but stiffness under off-axis loads.

21. The sensor of claim 18 wherein each strain gage is attached to a same side of an asymmetric instrumentation beam connecting a center area to a periphery of the transducer plate.

22. The sensor of claim 21 wherein a surface of each instrumentation beam on which a strain gage is attached comprises a straight edge on one side and a concave arcuate edge on the opposite side.

23. The sensor of claim 21 wherein a strain gage is attached to an instrumentation beam at a location that experiences strain from applied axial torque, but little or no strain from applied off-axis loads.

24. The sensor of claim 18 wherein the linearly dependent pairs of force and torque are Fx and Ty, and Fy and Tx.

25. A method of manufacturing a torque sensor, comprising:
providing a generally circular, generally planar transducer plate having a center area with a perpendicular center axis z, and a periphery;
forming one or more first mounting holes proximate the center area, the first mounting holes configured to be attached to a first object;
forming one or more second mounting holes proximate the periphery, the second mounting holes configured to be attached to a second object;
forming a plurality of voids through the transducer plate between the center area and periphery, wherein adjacent voids define spokes connecting the center area and periphery;
forming one or more radial slots through the transducer plate between the center area and periphery, each radial slot adjacent at least one void, wherein the transducer plate between a radial slot and a void defines an instrumentation beam connecting the center area and periphery, each instrumentation beam oriented generally radially along its entire length, and having the same thickness as the transducer plate along its entire length;
attaching a strain gage to an instrumentation beam; and
connecting the strain gage to a strain gage circuit outputting a voltage dependent on a strain-dependent resistance of the strain gage.

26. The method of claim 25 wherein forming a first plurality of voids through the transducer plate comprises drilling a first plurality of through-holes.

27. The method of claim 25 wherein attaching a strain gage to an instrumentation beam comprises attaching four strain gages, each to a same surface of a different instrumentation beam.

28. The method of claim 27 wherein the locations of the voids and radial slots, placement of the strain gages, and configuration of the strain gage circuits are such that a strain gage response for two different pairs of force and torque are linearly dependent, whereby the strain gage response under the force of each pair differs from strain gage response under the torque of that pair by a multiple, and the four strain gage responses comprise a four by four linear system, from which at least a torque about the axis is directly determined from the strain gage responses and a decoupling matrix.

* * * * *